(12) United States Patent
Ito et al.

(10) Patent No.: US 7,885,477 B2
(45) Date of Patent: Feb. 8, 2011

(54) IMAGE PROCESSING METHOD, APPARATUS, AND COMPUTER READABLE RECORDING MEDIUM INCLUDING PROGRAM THEREFOR

(75) Inventors: Wataru Ito, Ashigarakami-gun (JP); Hideki Yamagishi, Ashigarakami-gun (JP); Yuanzhong Li, Minato-ku (JP)

(73) Assignee: FUJIFILM Corporation (JP)

( * ) Notice: Subject to any disclaimer, the term of this patent is extended or adjusted under 35 U.S.C. 154(b) by 978 days.

(21) Appl. No.: 11/709,708

(22) Filed: Feb. 23, 2007

(65) Prior Publication Data

US 2007/0201750 A1    Aug. 30, 2007

(30) Foreign Application Priority Data

Feb. 24, 2006    (JP)    ............... 2006-048782

(51) Int. Cl.
*G06K 9/40*    (2006.01)
(52) U.S. Cl. .................................... 382/254
(58) Field of Classification Search ................ 345/621, 345/630; 382/254; 703/2
See application file for complete search history.

(56) References Cited

U.S. PATENT DOCUMENTS

| 7,068,835 B1 * | 6/2006 | Ban et al. .................... 382/154 |
| 7,471,833 B2 | 12/2008 | Skarbek et al. |
| 2004/0170323 A1 | 9/2004 | Cootes et al. |
| 2004/0193789 A1 * | 9/2004 | Rudolf ...................... 711/108 |
| 2005/0036712 A1 * | 2/2005 | Wada .......................... 382/305 |
| 2005/0169520 A1 * | 8/2005 | Chen et al. .................. 382/165 |
| 2005/0213820 A1 * | 9/2005 | Liu et al. ..................... 382/190 |

FOREIGN PATENT DOCUMENTS

| JP | 8-65519 A | 3/1996 |
| JP | 2004-54957 A | 2/2004 |
| JP | 2005-108195 A | 4/2005 |

OTHER PUBLICATIONS

T. F. Cootes, et al., "Active Appearance Models", in Proc. 5$^{th}$ European Conference on Computer Vision, 1998, vol. 2, 16 pages (pp. 484-498), Springer, Germany.
Japanese Office Action "Notice of Grounds of Rejection" dated Nov. 24, 2010; Japanese Patent Application No. 2006-048782 with English translation.

* cited by examiner

*Primary Examiner*—Bhavesh M Mehta
*Assistant Examiner*—Gregory F Cunningham
(74) *Attorney, Agent, or Firm*—Studebaker & Brackett PC; Donald R. Studebaker

(57) ABSTRACT

A face portion of an input image, an example of a predetermined structure, is applied to a mathematical model by the image recovery/addition section to recover a missing element of the face portion in the input image. The mathematical model is generated by a predetermined statistical method, such as the AAM scheme or the like, based on a plurality of sample images representing the face portion including the recovery target element. Thereafter, the face portion is reconstructed to include the missing element based on the parameter corresponding to the face portion obtained by applying the face portion to the model, and the face portion of the input image is replaced by the reconstructed face portion to produce a restored image by the image reconstruction section.

8 Claims, 10 Drawing Sheets

IMAGE PROCESSING METHOD, APPARATUS, AND COMPUTER READABLE RECORDING MEDIUM INCLUDING PROGRAM THEREFOR

BACKGROUND OF THE INVENTION

1. Field of the Invention

The present invention relates to an image processing method and apparatus for recovering a missing element of a predetermined structure, such as a face in an image or the like. It also relates to a computer readable recording medium including a program for causing a computer to perform the method.

2. Description of the Related Art

When taking photographs, there may be a case in which a photograph of main subject is obtained in partially shaded, depending on the imaging environment or the appearance of the subject. For example, if a person, the major subject, wearing a cap is imaged, the eyebrows or the eyes of the person may be shaded by the rim of the cap, and the eyebrows or the eyes of the person in the recorded image may become collapsed to dark. If a person, the major subject, standing over a net is imaged, the net pattern is superimposed on the face of the person in the recorded image.

Further, an excessively high contrast between the subject and the background may cause halation in the high signal region, or collapse in low signal region of the image.

Still further, if the subject is dark, or out of autofocus area, the resultant image may be blurred, that is, the image missing high-frequency component may be obtained.

In the mean time, a method for correcting digital images obtained by digital cameras or those obtained by scanning photograph prints by scanners is proposed as described, for example, Japanese Unexamined Patent Publication No. 8(1996)-065519. In the method, the center of a defective area of an image is specified by the user, and a predetermined surrounding region including the defective area is specified as a removal region. In addition, an interpolation region required for interpolating the removal region is specified in the surrounding area of the removal region. Then, the interpolation region is extended gradually and linearly toward the defective area to replace the pixels within the removal region with the pixels of the interpolation region, and thereby the defective area is removed and corrected.

The aforementioned method is an effective image correction method when a defective area (removal region) is readily replaced by the surrounding region (interpolation region), such as the region of the sky or the ocean. But, when an image component with a unique shape, such as an eye, a nose, a mouth, or the like, is masked by a shield, or having halation or collapse therein, it is impossible for the method to recover the masked component, since no identical component exists in the surrounding region. Further, it can not correct an image with a specific color image signal being lost, or a blurred image.

SUMMARY OF THE INVENTION

The present invention has been developed in view of the circumstances described above, and it is an object of the present invention to provide an image processing method and apparatus capable of accurately recovering various types of defects in an image. It is a further object of the present invention to provide a computer readable recording medium including a program therefor.

An image processing method of the present invention comprises the step of applying a predetermined structure in an input image, representing that an element of the structure is missing, to a model other than the missing element to recover the missing element of the structure in the input image, the model representing the predetermined structure by a statistical characteristic amount obtained by performing predetermined statistical processing on a plurality of images representing the predetermined structure including the recovery target element.

An image processing apparatus of the present invention is an apparatus for performing the image processing described above. That is, the apparatus comprises:

a model representing a predetermined structure by a statistical characteristic amount obtained by performing predetermined statistical processing on a plurality of images representing the predetermined structure including a recovery target element; and a recovery means for applying the predetermined structure in an input image, representing that the element of the predetermined structure is missing, to the model other than the missing element to recover the missing element of the structure in the input image.

A computer readable recording medium of the present invention is a recording medium including a program for causing a computer to perform the image processing method described above.

That is, the features of the image processing method, apparatus, and program therefor are that a recovery target element of a predetermined structure does not exist in an input image but exists only in the model, and the recovery is performed by correlating the predetermined structure with the model other than the recovery target element and estimating the recovery target element based on the correlation.

The image processing method, apparatus, and program therefor will now be described in detail.

As a specific method for realizing image processing according to the present invention, an AAM (Active Appearance Models) scheme may be employed. The AAM scheme is one of the approaches for trying to interpret image contents based on a model. For example, if a face is the interpretation target object, a mathematical model of a face is generated by performing a principal component analysis on the shapes of the face portions of a plurality of learning images, or on the luminance data after normalization of the shapes. Then, the face portion of a new input image is represented by each of the principal components and a weighting parameter thereof to reconstruct the face image. The method is described in a non-patent literature "Active Appearance Models" by T. F. Cootes, et al., In Proc. 5th European Conference on Computer Vision, Springer, Germany, 1998, vol. 2, pp. 484-498 (reference document 1).

Preferably, the "predetermined structure" is a structure appropriate for modeling, i.e., a structure whose variation in the shape or luminance in the image falls within a certain range. In particular, a structure from which a statistical characteristic amount having a higher level of explanatory power for the shape or luminance thereof may be derived by performing statistical processing thereon. One of the specific examples is a human face.

The recovery target element, i.e., the missing element in an input image may include a portion of the region of a predetermined structure, a portion of color signals representing the predetermined structure, a portion of spatial frequency components representing the predetermined structure, the number of gradations representing the predetermined structure, or the like.

For example, if the predetermined structure is a human face, the loss of a portion of the region of the predetermined structure may include, a portion of the face being collapsed to dark due to the shadow of the rim of the cap of the person, a portion of the face being masked by a shield standing between the face and the imaging device, or the like. Further, it may also include the case that a signal of at least one channel of a portion of the region of the predetermined structure being lost due to a compression or transmission error of the imaging device. Still further, a face without glasses may be deemed as the loss of the glasses. Thus, the process for recovering a missing part of the region of the predetermined structure includes the addition (recovery) of appendages (ornaments) to the structure.

Specific examples of the loss of a portion of color signals representing the predetermined structure may include the loss of one of R, G, and B signals due to a compression or transmission error of the imaging device, or halation in high signal level component and collapse in low signal level component. Further, it may include the case where a monochrome image is deemed as the loss of color data and reconstructed as a color image. The color space is not limited to RGB, and YCC or the like may also be used. Preferably, however, the process is performed on RGB signals, since the halation in a high signal level component is more likely to occur in R signal.

Specific examples of the loss of a portion of spatial frequency components representing the predetermined structure may include the loss of a high frequency component such as an edge. Further, a face without pimples, wrinkles, or the like may be deemed as the loss of spatial frequency components representing the pimples, wrinkles, or the like.

The loss of the number of gradations means the state of being a smaller number of gradations, and an image with smaller number of gradations is reconstructed as an image with a greater number of gradations by the image processing of the present invention.

Further, the recovery target element may include the aforementioned elements mixed together. Specific examples include the case where a non-makeup face is deemed as the loss of makeup and reconstructed as a made-up face, and the case where an image obtained by a low performance camera, such as a cell phone camera, is reconstructed like an image obtained by a high performance camera.

"An image representing the predetermined structure including the recovery target element" may be an image of the predetermined structure that includes the recovery target element obtained by actually imaged, i.e., the image obtained by imaging the structure without any missing element, or an image obtained by artificially performing correction on an image not including the recovery target object to recover the target element.

As for the "predetermined statistical processing", a dimension compression processing capable of representing the structure by compressing it to a statistical amount with the number of dimensions less than the number of pixels representing the structure be preferable. A specific example may be a multivariate statistical technique, such as the principal component analysis or the like. If the principal component analysis is performed as the "predetermined statistical processing", the "statistical characteristic amount" means a plurality of principal components obtained by the principal component analysis.

The level of the explanatory power described above means that a higher order principal component has a higher level of explanatory power, and a lower order principal component has a lower level of explanatory power, taking the case where the predetermined statistical processing is a principal component analysis as an example.

The "(predetermined) structure in an input image" may be detected either automatically or manually. Further, the present invention may further include a process for detecting the structure in an input image, or the region of the structure detected from an input image in advance may be used as the input for applying to the model.

The referent of "applying a predetermined structure in an input image to a model other than the missing element" as used herein means arithmetic operations or the like for representing the structure in the image by the model. More specifically, it means to obtain a weighting parameter value for weighting each of the principal components in the mathematical model to represent the structure in the input image by the mathematical model, taking the case where the AAM is used as an example.

Further, an arrangement may be made in which a plurality of models of the present invention is provided, each for each attribute of the predetermined structure; information of the attribute of the structure in the input image is obtained; a process (means) for selecting the model according to the obtained attribute is additionally provided; and the predetermined structure in the input image is applied to the selected model.

The referent of "attribute" as used herein means, for example, the gender, age, or race, if the predetermined structure is a human face. Further, it may be information for identifying an individual. In this case, the model for each attribute means the model for each individual.

Specific methods for obtaining the "attribute" may include any known recognition process for images as described, for example, in Japanese Unexamined Patent Publication No. 11 (1999)-175724, or a method of estimating/obtaining it from the information appended to the image such as GPS information or the like.

The image processing method of the present invention may be used for reconstruction of a photograph for funeral, i.e., the photograph of a deceased person, reconstruction of a face image inputted for matching in face authentication, as well as reconstruction of general photograph images.

According to the image processing method and apparatus, and the computer readable recording medium including the program therefor, a missing element of a predetermined structure in an image may be recovered completely by applying the structure to a model representing the structure including the missing element as the recovery target element. Accordingly, various different types of defects in an image may be recovered accurately and easily without requiring any operational skills.

If an arrangement is made in which plurality of models of the present invention is provided, each for each attribute of the predetermined structure; the attribute of the structure in the input image is obtained; a process (means) for selecting a model according to the obtained attribute is additionally provided; and the predetermined structure in the input image is applied to the model of the selected attribute, the structure in the input image may be applied to a more appropriate model, so that the processing accuracy is improved, and a higher quality image may be obtained.

DESCRIPTION OF THE PREFERRED EMBODIMENTS

Hereinafter an exemplary embodiment of the present invention will be described with reference to the accompanying drawings, taking a case in which a portion of a face being collapsed to dark in an image due to the shadow of the rim of the cap of the subject is recovered by the image processing of the present invention as an example.

Figure 1:
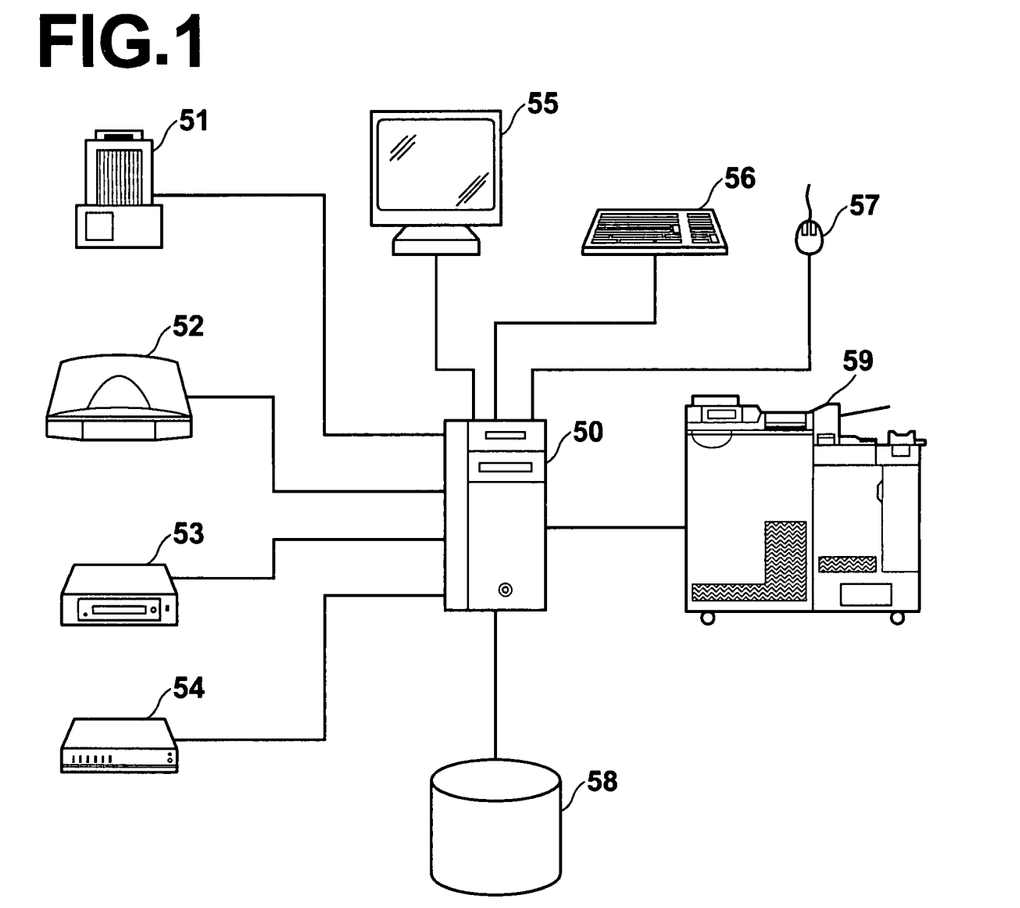
FIG. 1 schematically illustrates a hardware configuration of a digital photograph printer according to an embodiment of the present invention.

FIG. 1 schematically illustrates a hardware configuration of a digital photograph printer according to an embodiment of the present invention. As shown in the drawing, the digital photograph printer includes: a film scanner 51; a flat head scanner 52; a media drive 53; a network adapter 54; a display 55; a keyboard 56; a mouse 57; a hard disk 58; and a photograph print output unit 59, all of which are connected to an arithmetic/control unit 50.

The arithmetic/control unit 50 controls flows of image input, correction, retouching, and output, in addition to performing arithmetic operations in image processing for correction and retouching in collaboration with a CPU, a main memory, various output interfaces within the unit by executing a program installed from a storage medium, such as a CD-ROM or the like. The restoration process of the present invention is performed in the unit.

The film scanner 51 photoelectrically scans an APS negative film or a 135 negative film developed by a developing machine (not shown), and obtains digital image data P0 representing a photograph image recorded on the negative film.

The flat head scanner 52 photoelectrically scans a photograph image on a hard copy, such as an L-size photograph print or the like, and obtains digital image data P0.

The media drive 53 obtains image data P0 representing a photograph image recorded on a recording medium, such as a memory card, CD, DVD, or the like. The media drive 53 may also record output image data P2 on these recording media. Note that image data of an image obtained by, for example, a digital camera is recorded on the memory card. Further, for example, image data obtained by the film scanner 51 in the previous print order are recorded on the CD, DVD, and the like.

The network adapter 54 obtains image data P0 from an order acceptance machine (not shown) of a known network photograph service system. The image data P0 are image data based on a photograph print order placed by a user, and sent to the order acceptance machine from a personal computer of the user through the Internet. The image data P0 may also be those sent from the photograph print order acceptance machine installed in front of a lab shop.

The display 55 is a display for displaying operation screens for input, correction, retouching, and output of images in the digital photograph printer according to the present embodiment, and a menu for selecting an operation, a processing target image, or the like is displayed. The keyboard 56 and the mouse 57 are used for selecting a specific process.

The hard disk 58 includes a control program of the digital photograph printer. In addition, it temporarily stores image data P0 obtained by the film scanner 51, flat head scanner 52, media drive 53, or network adapter 54, corrected image data P1, and retouched image data P2 (output image data).

The photograph print output unit 59 performs laser scan exposure of a photographic paper based on image data P2 representing an output image, development, and drying. It also performs back printing, print by print paper cutting, sorting for each order. The printing method may be a laser exposure—thermal development—dye transfer process, or the like.

Figure 2:
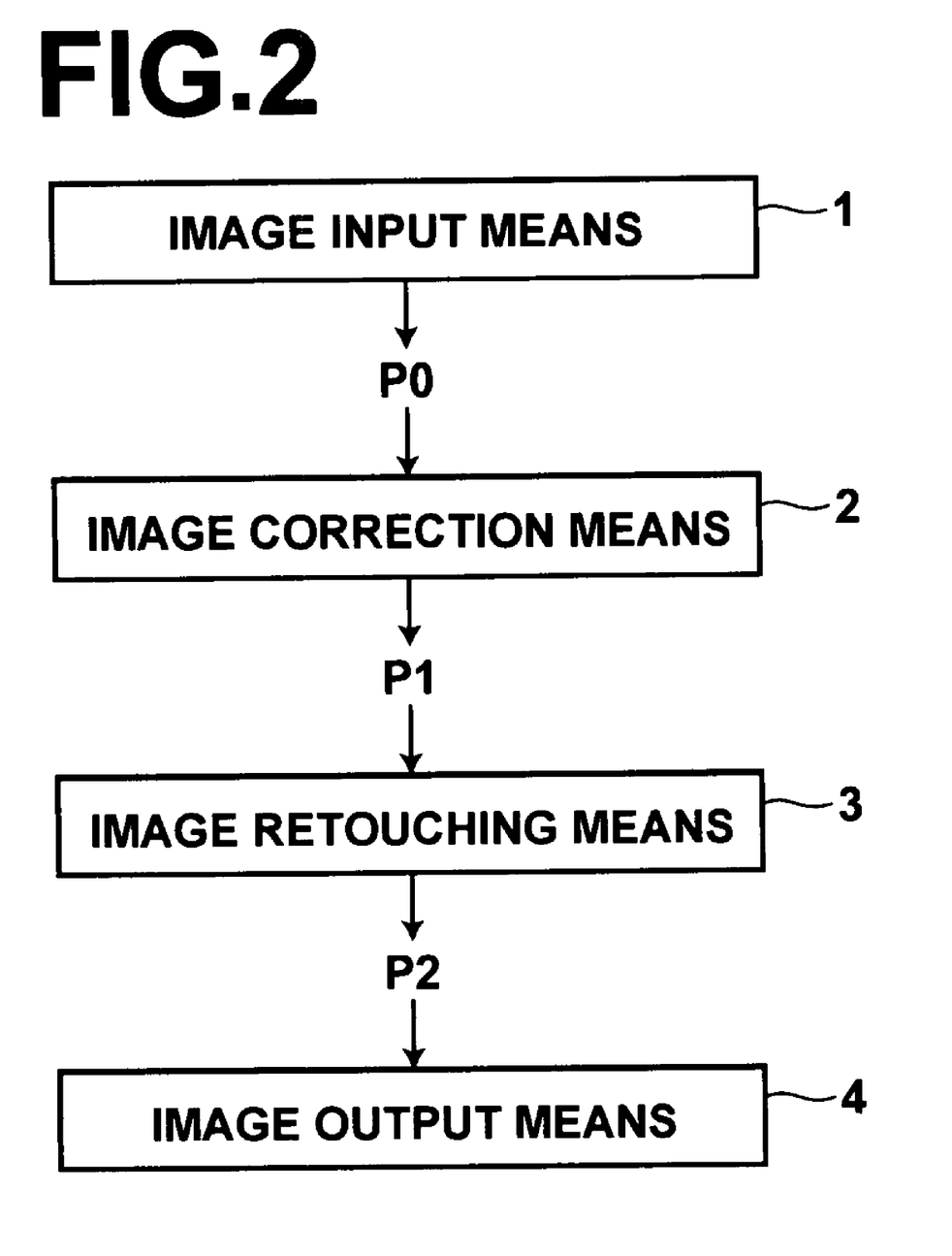
FIG. 2 is a block diagram of the digital photograph printer and digital camera according to the embodiment of the present invention, illustrating the functions and process flow thereof.

FIG. 2 is a block diagram of the digital photograph printer illustrating the functions and process flow thereof. As illustrated, from the aspect of function, the digital photograph printer includes: an image input means 1 for inputting image data of a print target image; an image correction means 2 for performing image processing on the image data P0 inputted thereto based on predetermined image processing conditions to automatically correct image quality of the image represented by the image data P0 (hereinafter, image data and the image represented by the image data are denoted by the same reference symbol); an image retouching means 3 for performing image processing on the automatically corrected image data P1 inputted thereto based on an instruction from the operator; and an image output means 4 for outputting a photograph print based on the retouched image data P2 or outputting the image data P2 to a recording medium.

The image correction means 2 performs white balance, contrast, and sharpness corrections, noise reduction/removal, and the like. The image retouching means performs image retouching, such as manual correction of the processed results of the image correction means 2, trimming, enlargement/reduction, sepiatization, monochrome conversion, combining with a decorated frame, as well as image recovery according to the present invention.

An operations and a process flow of the digital photograph printer will now be described.

First, image data P0 are inputted through the image input means 1. When outputting an image recorded on a developed film for printing or the like, the operator sets the film on the film scanner 51, or when outputting image data recorded on a recording medium, such as a memory card or the like, for printing or the like, the operator sets the recording medium on the media drive 53. In the mean time, a screen for selecting input source of the image data is displayed on the display 55, and the operator selects the input source using the keyboard 56 or the mouse 57. When the film is selected as the input source, the film set on the film scanner 51 is photoelectrically scanned by the film scanner 51, and the scanning result is subjected to digital conversion to generate image data P0, which are then sent to the arithmetic/control unit 50. If a hard copy script, such as a photograph print or the like, is selected, the hard copy script, such as a photograph print or the like, set on the flat head scanner 52 is photoelectrically scanned by the flat head scanner 52, and the scanning result is subjected to digital conversion to generate image data P0, which are then sent to the arithmetic/control unit 50. If a recording medium, such as a memory card or the like, is selected, image data P0 recorded on the recording medium, such as a memory card or the like, set on the media drive 53 are read by the arithmetic/control unit 50. If the input source is a photograph print order acceptance machine of a network photograph service system or a photograph print order acceptance machine installed in front of a photograph shop, image data P0 is received by the arithmetic/control unit 50 through the network adapter 54. The image data P0 obtained in the manner as described above are temporarily stored in the hard disk 58.

Then, the automatic image quality correction is performed on the image P0 by the image correction means 2. More specifically, known white balance, contrast, and sharpness corrections, noise reduction/removal, and the like are performed by the image processing program executed in the arithmetic/control unit 50 based on the setup conditions preset in the digital photograph printer, and processed image data P1 are outputted. The outputted image data P1 are temporarily stored in the memory of the arithmetic/control unit 50. Note that the image data P1 may be temporarily stored in the hard disk 58.

Figure 3A:
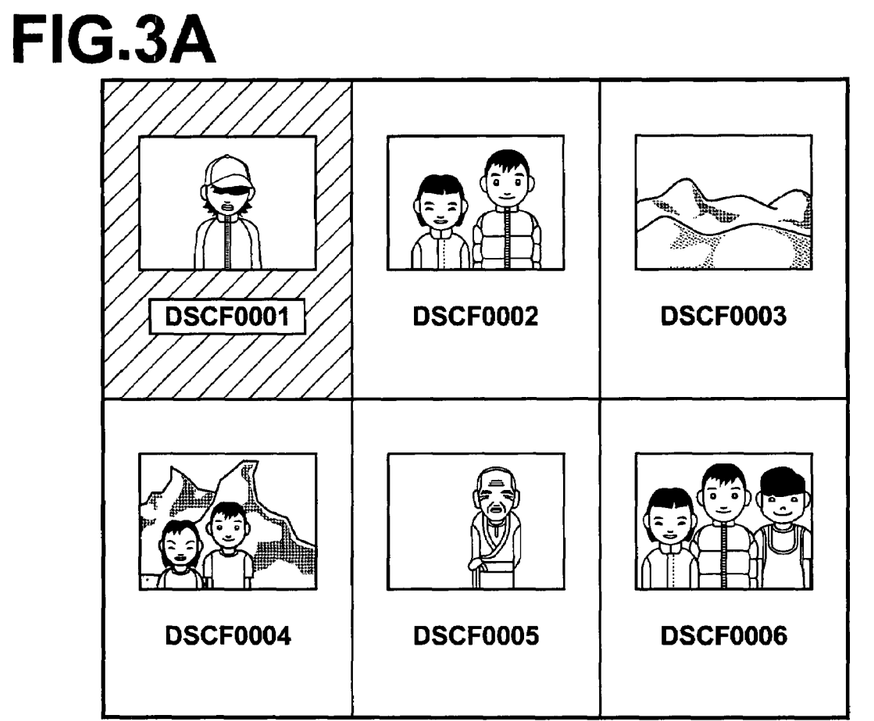
FIGS. 3A and 3B illustrate example screens displayed on the display of the digital photograph printer and digital camera according to the embodiment of the present invention.
Figure 3B:
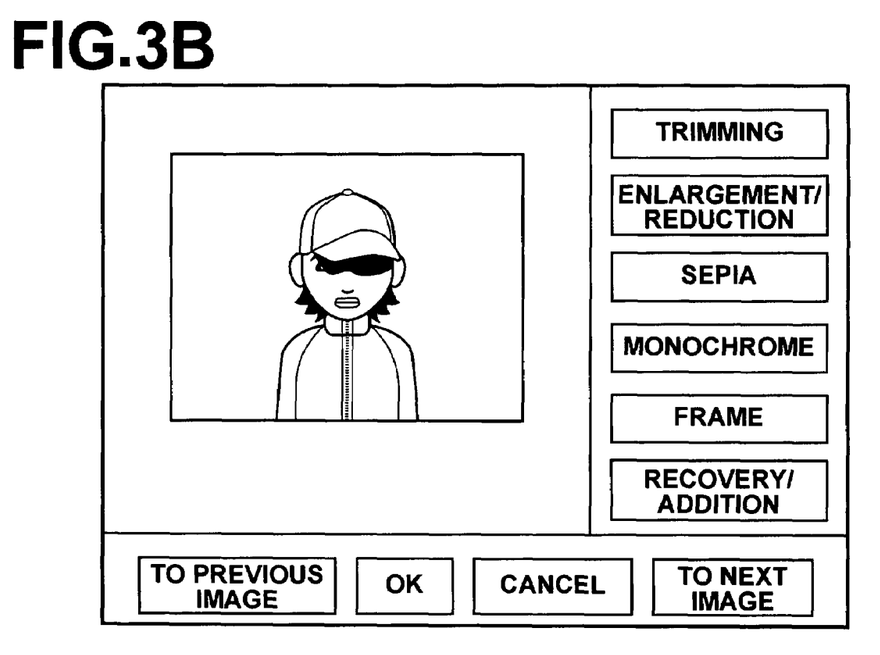
Figure 4:
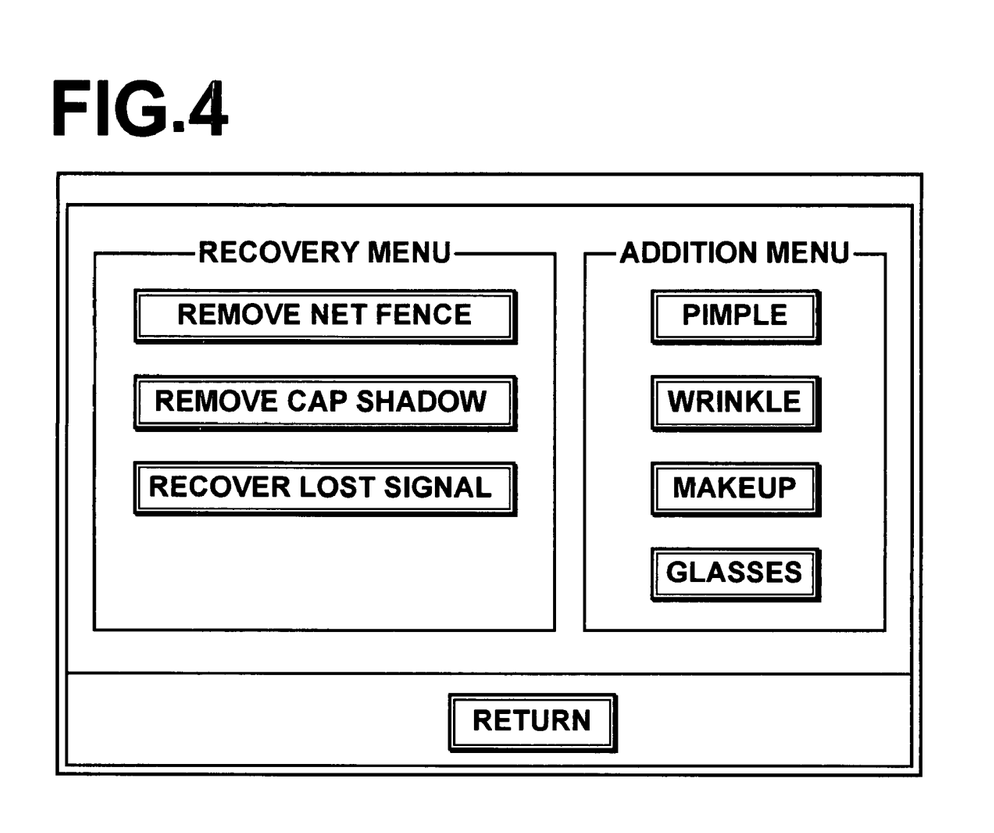
FIG. 4 illustrates an example menu screen for selecting details of an image recovery/addition process according to an embodiment of the present invention.

Thereafter, a thumbnail image of the corrected image P1 is generated and displayed on the display 55 by the image retouching means 3. FIG. 3A illustrates an example screen displayed on the display 55. The operator confirms thumbnail images and selects an image that requires a manual image quality correction or an image with an image retouching order using the mouse 57 or the keyboard 56 (in FIG. 3A, an upper left image DSCF0001 is selected). Then, an example screen is shown in FIG. 3B, the thumbnail image is displayed on the display 55 in an enlarged form, in addition to the buttons for selecting a manual correction operation or a retouching operation. The operator selects an intended operation from the displayed buttons using the mouse 57 or the keyboard 56, and further sets a detail of the selected operation as required. In the present embodiment, if the "recovery/addition" button shown in FIG. 3B is selected/depressed by the operator, a menu screen for selecting a detail of the recovery/addition process is displayed as shown in FIG. 4. The image retouching means 3 performs image processing according to the selected operation, and outputs processed image data P2. The outputted image data P2 are stored in the memory of the arithmetic/control unit 50. Note that the image data P1 may be temporarily stored in the hard disk 58. The image display on the display 55 by the image retouching means 3, acceptance of input through the mouse 57 or the keyboard 56, image processing for manual correction or retouching, and the like are controlled by the program executed in the arithmetic/control unit 50.

Finally, the image P2 is outputted by the image output means 4. Here, the arithmetic/control unit 50 causes the display 55 to display a screen for selecting an output destination. The operator selects a desired output destination using the mouse 57 or the keyboard 56, and the image data P2 are sent to the selected destination by the arithmetic/control unit 50. If a photograph printing is performed, the image data P2 are sent to the photograph print output unit 59, and the image data P2 are outputted as a photograph print. If the output destination is a recording medium, such as a CD or the like, the image data P2 are recorded on the CD or the like set on the media drive 53.

The image recovery/addition process according to the present invention, which is performed when "recovery/addition" is selected from the screen shown in FIG. 3B, and "Remove Cap Shadow" is selected from the screen shown in FIG. 4, will now be described in detail. The process for "Remove Cap Shadow" is a process for recovering a portion of an image around the eyes of the subject person being collapsed to dark due to the shadow of the cap of the person as shown in FIG. 3B (hereinafter referred to as "eye area" or simply "eyes").

Figure 5:
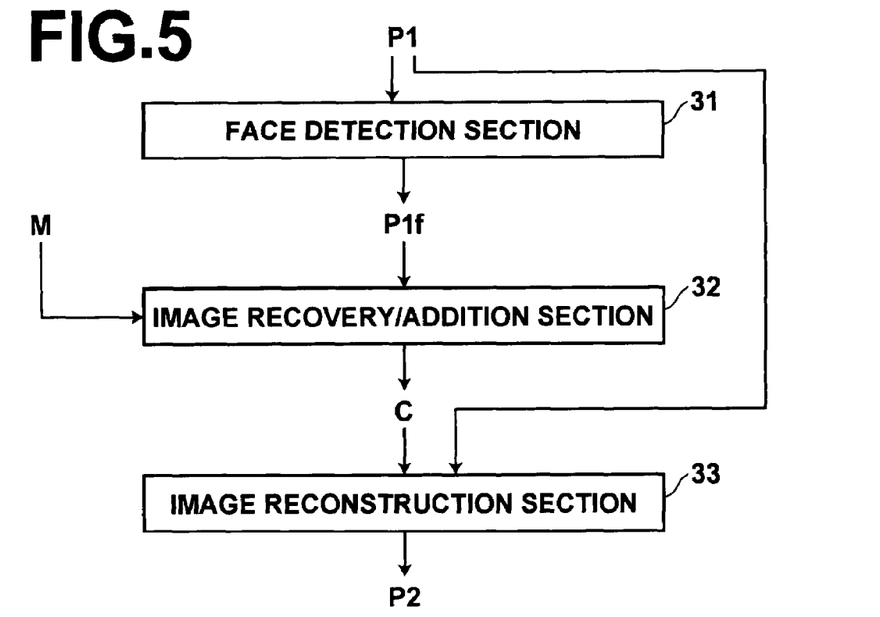
FIG. 5 is a block diagram illustrating in detail of the image recovery/addition process according to an embodiment of the present invention.

FIG. 5 is a block diagram illustrating in detail of the image recovery/addition process. As illustrated, the image recovery/addition process is realized by: a face detection section 31 for detecting a face portion P1$f$ of an image P1; an image recovery/addition section 32 for recovering the eye area of the detected face portion P1$f$ by applying the detected face portion P1$f$ to a mathematical model M generated by the AAM scheme (refer to reference document 1) based on a plurality of sample images representing human face portions including the eyes, i.e., the recovery target; and an image reconstruction section 33 for reconstructing an image P1$f'$ of the face portion with recovered eyes based on a parameter C (to be described later) corresponding to the face portion P1$f$ obtained by applying the face portion P1$f$ to the mathematical model, and fitting the image P1$f'$ to the face portion of the image P1 and merging therein, thereby generating an image P2 with recovered eye area of the image P1. The process steps are controlled by a program installed on the arithmetic/control unit 50.

Figure 6:
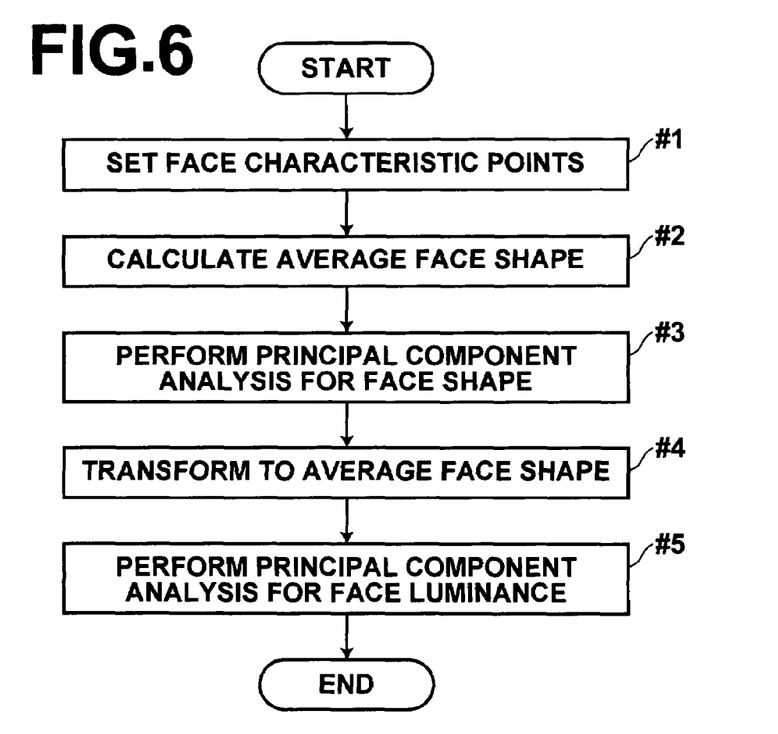
FIG. 6 is a flowchart illustrating a process flow for generating a mathematical model of a face image according to the present invention.

The mathematical model M is generated based on the flowchart shown in FIG. 6, and preinstalled on the arithmetic/control unit 50 together with the aforementioned program. A generation process of the mathematical model M will now be described.

Figure 7:
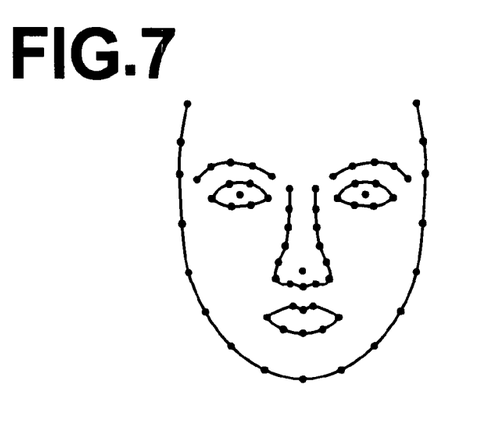
FIG. 7 illustrates example characteristic points set on a face.

First, characteristic points representing a face shape are set on each of a plurality of face images (sample images) that includes the eye area, i.e., the recovery target, as shown in FIG. 7 (step #1). Here, the number of characteristic points is 122 (FIG. 7 indicates only 60 characteristic points for clarity). Location of each of the characteristic points is predefined like, for example, the first characteristic point is at the left end of the left eye, the $38^{th}$ characteristic point is at the midpoint between the eyebrows, and the like. Each characteristic point may be set either manually or automatically through a recognition process. It may be corrected manually as required after automatic setting.

Then, an average face shape is calculated based on the characteristic points set on each of the sample images (step #2). More specifically, average values of position coordinates of the characteristic points representing the same region on the respective sample images are obtained.

Figure 8:
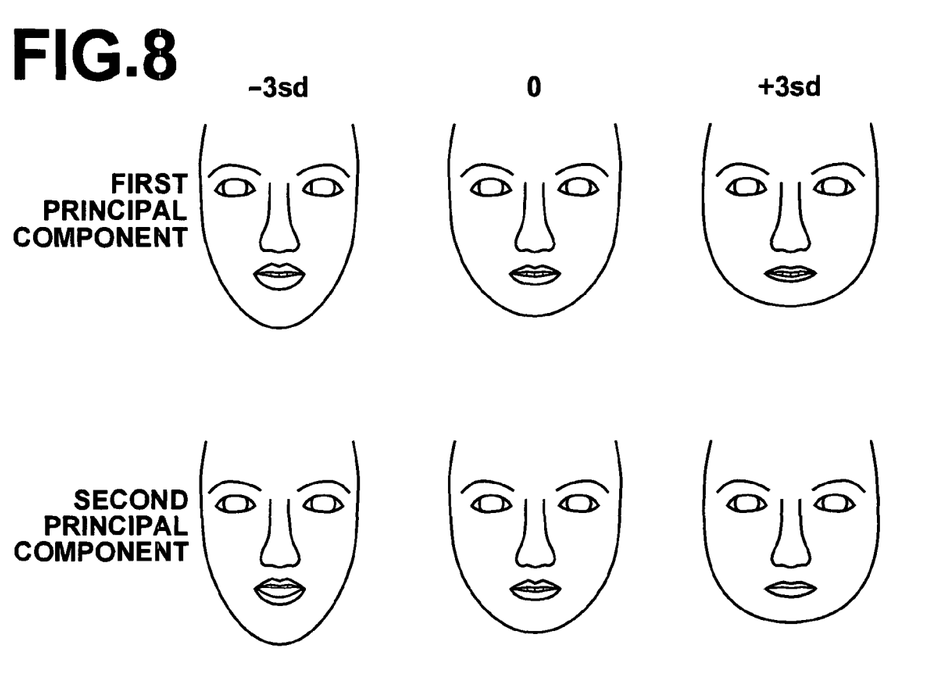
FIG. 8 schematically illustrates the variation in face shapes when the value of the weighting factor for a unique vector of a principal component obtained by a principal component analysis for a face shape is varied.

Further, a principal component analysis is performed based on the characteristic points representing the face shape in each of the sample images and the position coordinates of the average face shape (step #3). As a result, any face shape may be approximated by the following formula (1).

$$S = S_0 + \sum_{i=1}^{n} p_i b_i$$

where: S is the shape vector on which the position coordinates of each characteristic point of a face shape are arranged $(x_1, y_1, \text{---} x_{122}, y_{122})$; $S_0$ is the average face shape vector on which the position coordinates of each characteristic point on the average face shape are arranged; $p_i$ is a unique vector representing the $i^{th}$ principal component of the face shape obtained by the principal component analysis; and $b_i$ is a weighting factor for each unique vector $p_i$. FIG. 8 schematically illustrates how the face shape varies when the values of the weighting factors $b_1$ and $b_2$ for the unique vectors $p_1$ and $p_2$ of the top two principal components obtained by the principal component analysis are varied. The variation width is from −3sd to +3sd, which is based on the standard deviation sd of the values of the weighting factors $b_1$ and $b_2$ when the face shape of each sample image is represented by the formula (1) above. The face shape in the center of the three face shapes in each principal component is the average face shape. This example shows that a component contributing to the contour shape of the face is derived as the first principal component as a result of the principal component analysis, and the face shape varies from an elongated face (−3sd) to a round face (+3sd) by varying the weighting factor $b_1$. Similarly, components contributing to open/close states of the mouth and jaw length are derived as the second principal component, and the face shape varies from a face with long jaw and open mouth (−3sd) to a face with short jaw and closed mouth (+3sd) by varying the weighting factor $b_2$. Note that a smaller value of i has stronger explanatory power of the shape. That is, it means a greater contribution to the face shape.

Figure 9:
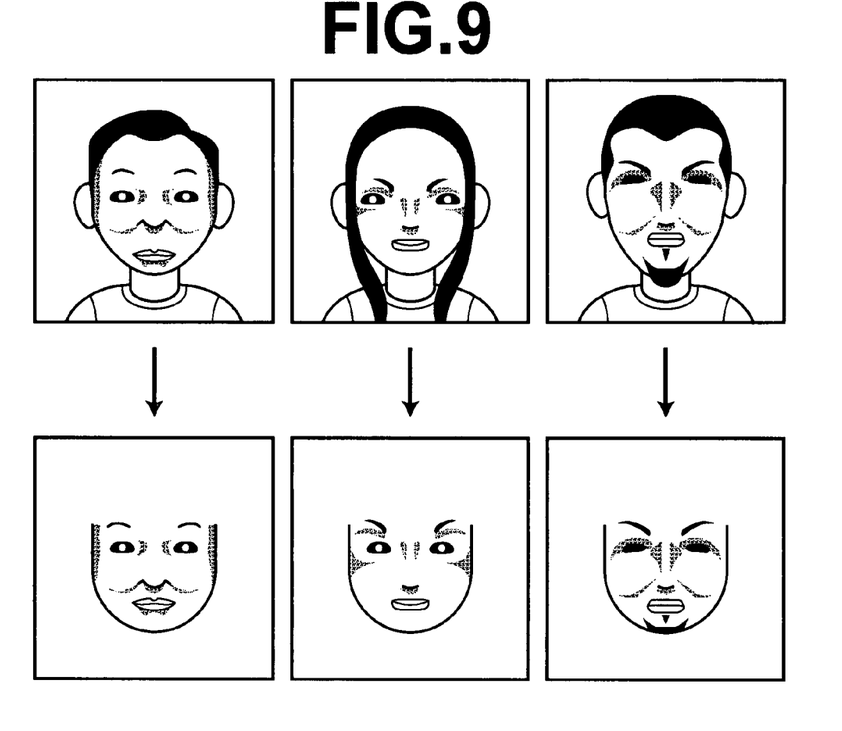
FIG. 9 illustrates that face shapes in sample images are transformed into an average face shape, and indicating the luminance thereof under the average face shape.

Next, each of the sample images is transformed (warped) to the average face shape obtain in step #2 (step #4). More specifically, the amount of shift for each of the characteristic points between each of the sample images and the average face shape is calculated, and based on the calculated amount of shift, an amount of shift of each of the sample images to the average face shape on a pixel basis is calculated by the following formulae (2) to (5) (two dimensional quintic polynomial), and each of the sample images is warped to the average face shape on a pixel basis.

$$x' = x + \Delta x \quad (2)$$

$$y' = y + \Delta y \quad (3)$$

$$\Delta x = \sum_{i=0}^{n} \sum_{j=0}^{n-1} a_{ij} \cdot x^i \cdot y^j \quad (4)$$

where: x and y are the coordinates of each characteristic point in each sample image; x' and y' are coordinates on the average face shape to be warped; $\Delta x$ and $\Delta y$ are amounts of shift to the average shape; n is the order; and $a_{ij}$ and $b_{ij}$ are coefficients. The coefficient for polynomial approximation is obtained by the least squares method. Here, for a pixel whose coordinate value after warping is not an integer value, and moved to a position including a fractional part, the pixel value thereof is obtained from four adjacent pixels by first order approximation. That is, the pixel value thereof is distributed to four surrounding pixels in proportion to the distance between the coordinate thereof to each of the pixels after warping. FIG. 9 illustrates that face shapes of three sample images are transformed into an average face shape, and indicating the luminance thereof under the average face shape.

Figure 10:
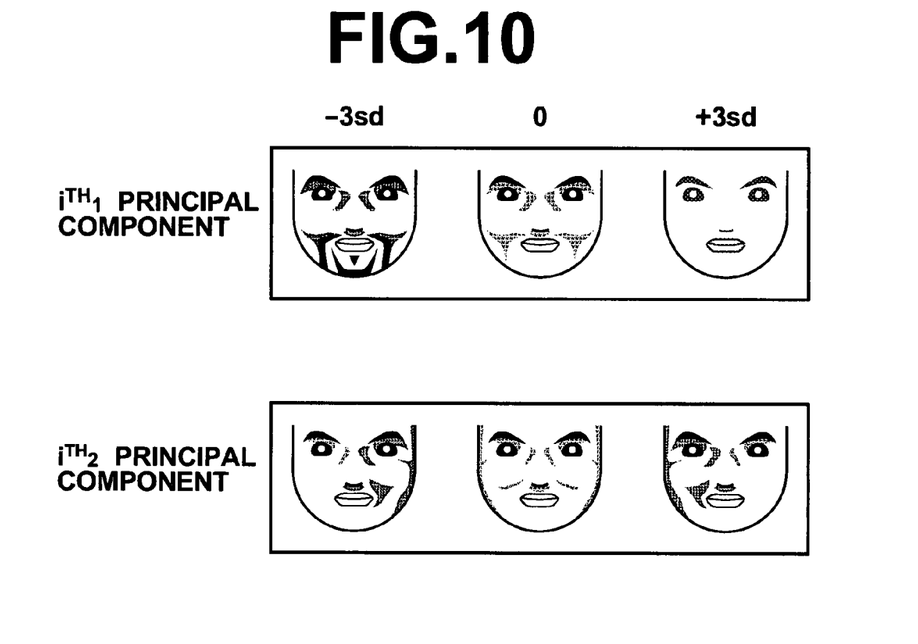
FIG. 10 schematically illustrates the variation in face luminance when the value of the weighting factor on a unique vector of a principal component obtained by principal component analysis for face luminance is varied.

Further, based on the luminance of each of the sample images after transformed into the average face shape, a principal component analysis is performed (step #5). As a result, the luminance of any face image under the average face shape may be approximated by the following formula (6).

$$A = A_0 + \sum_{i=1}^{m} q_i \lambda_i \quad (6)$$

where: A is a luminance vector on which the luminance of each pixel under the average face shape is arranged $(a_1, \text{---} a_m$, m is the total number of pixels on the average face shape); A0 is an average face luminance vector on which the average luminance value of each pixel of each sample image in the average face shape is arranged; $q_i$ is a unique vector representing the $i^{th}$ principal component of the face luminance obtained by the principal component analysis; and $\lambda_i$ is a weighting factor for each unique vector $q_i$. FIG. 10 schematically illustrates how the face luminance varies when the values of the weighting factors $\lambda_{i1}$ and $\lambda_{i2}$ for the unique vectors $q_{i1}$ and $q_{i2}$ representing the $i^{th}{}_1$ and $i^{th}{}_2$ principal components respectively obtained through the principal component analysis are varied. The variation width is from −3sd to +3sd, which is based on the standard deviation sd of the values of the weighting factors $\lambda_{i1}$ and $\lambda_{i2}$ when the face luminance of each sample image is represented by the formula (6) above. This example shows that a component contributing to the existence or nonexistence of beard is derived as the $i^{th}{}_1$ principal component as a result of the principal component analysis, and the face luminance varies from a face with dense beard (−3sd) to a face without beard (+3sd) by varying the weighting factor $\lambda_{i1}$. Similarly, a component contributing to the shadow on the face is derived as the $i^{th}{}_1$ principal component, and the face luminance varies from a face with shadows on the right side (−3sd) to a face with shadows on the left side (+3sd) by varying the weighting factor $\lambda_{i2}$. Note that a smaller value of i has stronger explanatory power of the luminance. That is, it means a greater contribution to the face luminance.

The mathematical model M of a face is generated through steps #1 to #5 described above. That is, the mathematical model M is represented by a plurality of unique vectors $p_i$ representing face shapes and unique vectors $q_i$ representing face luminance under the average face shape, which is dimension compressed in which the total number of each type of unique vectors is far smaller than the number of pixels forming the face image. Note that in the embodiment described in the reference document 1, a mathematical model of a face image with 23 unique vectors for the face shape, and 114 unique vectors for the face luminance is generated by setting 122 characteristic points for an image formed of 10,000 pixels and performing the aforementioned process, and it is described that 90% of variations in the shape and luminance may be represented by varying the weighting factor for each unique vector.

An image recovery/addition process flow based on the ARM scheme using the mathematical model M will now be described with reference to FIGS. 5 and 11.

Figure 11A:
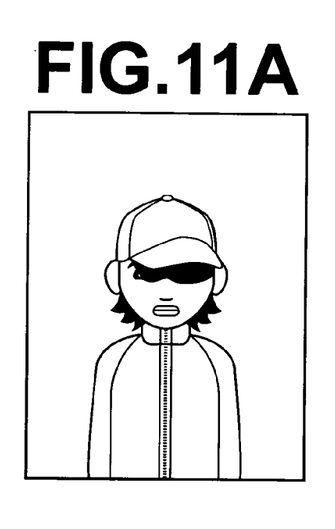
FIGS. 11A to 11D illustrate that an input image is varied in a stepwise manner by the image recovery/addition process of the present invention.
Figure 11B:
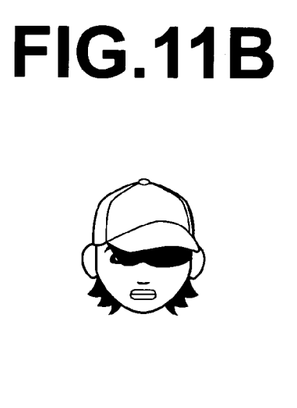
Figure 11C:
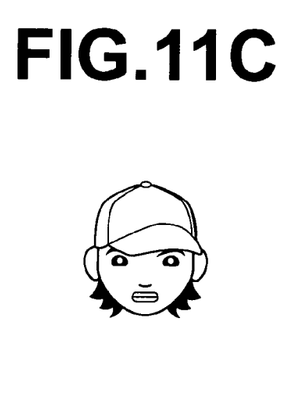
Figure 11D:
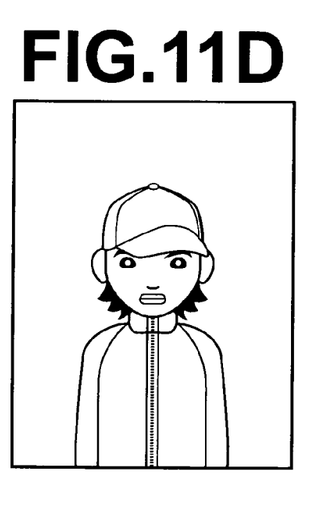

First, the face detection section 31 reads in image data P1, and detects a face portion P1$f$ (FIG. 11B) of the image P1 (FIG. 11A). More specifically, the following method as described in Japanese Unexamined Patent Publication No. 2005-108195 (reference document 2) may be applicable. That is, a determination is made whether a face candidate region is present in the image P1 by inputting a first characteristic amount indicating the direction of a gradient vector representing the direction and magnitude of an edge at each pixel to a plurality of first discriminators (to be described later). If a face candidate region is present, the region is extracted, and the magnitude of the gradient vector at each pixel on the extracted region is normalized. Then, a determination is made whether the extracted face candidate region is a true face region by inputting a second characteristic amount indicating the magnitude and direction of the normalized gradient vector to a second discriminator (to be described later), and if it is determined to be a true face region, the region is extracted as the face portion P1$f$. Here, the first/second discriminators are generated through a learning process of a machine learning technique, such as AdaBoost or the like, which uses the first/second characteristic amounts calculated for a plurality of images known to be of faces and a plurality of images known to not be of faces, which are sample images for learning, as input. In the present embodiment, images with eye areas are collapsed to dark due to a cap shadow are used as sample images for learning.

Various different known methods may be used for detecting the face portion P1$f$, which may include: a method that uses a correlation score between a unique face expression and the image itself as described in U.S. Patent Application Publication No. 20040170323 (reference document 3), knowledge database, characteristics extraction, flesh color detection, template matching, graph matching, statistical methods (neural network, SVM, HMM), and the like. Further, when a face image P1 is displayed on the display 55, the face portion P1$f$ may be manually specified using the mouse 57 or the keyboard 56, or an automatic detection result may be manually corrected.

Next, the image recovery/addition section 32 applies the face portion P1$f$ to the mathematical model M. More specifically, it reconstructs the image based on the formulae (1) and (6) described above by varying the values of weighting factors for the unique vectors $p_i$ and $q_i$ from the top principal components in formulae (1) and (6) and obtains weighting factors $b_i$ and $\lambda_i$ (collectively referred to as "parameter C") when the difference between the reconstructed image and the face portion P1$f$ is minimal (refer to the reference document 3 for detail). Note that it is preferable that the range of the values of the weighting factors $b_i$ and $\lambda_i$ be based on the standard deviations sd of the distributions of $b_i$ and $\lambda_i$ when the sample images are represented by the formulae (1) and (6) at the time of generating the model, and limited to, for example, from −3sd to +3sd, and if the values do not fall in the range, the average values of the distributions be used. This may prevent an erroneous application of the model.

Further, the image reconstruction section 33 reconstructs a face image P1$f'$ (FIG. 11C) by substituting the parameter C to the formulae (1) and (6), and further, generates an image P2 (FIG. 11D) by replacing the face portion P1$f$ of the image P1 with the reconstructed face image P1$f'$ and merging into the image P1, and outputs image data P2.

As describe above, according to the image recovery/addition process of the present embodiment, the image recovery/addition section 32 applies the face portion P1$f$ detected by the face detection section 31 from the image P1 with the eye area thereof being collapsed to dark due to the shadow of the cap of the subject to the mathematical model M generated through the AAM scheme based on a plurality of sample images representing faces including the eye area. The image reconstruction section 33 reconstructs the image P1$f'$ recovered in the eye area based on the parameter C corresponding to the face portion P1$f$ obtained by applying the face portion P1$f$ to the mathematical model M, and further generates the image P2 by fitting the face portion P1$f'$ into the face portion of the image P1 and merging therein. Here, the mathematical model M is generated from sample images representing the face portion including the eye area, so that the eye area, being collapsed to dark in the image P1, may be depicted in the model M. Accordingly, even if the eye area of the face portion of the input image P1 is collapsed to dark, an image obtained by applying the face portion P1$f$ of the input image P1 to the model M is recovered in the eye area. In this way, according to the image recovery/addition process of the present invention, the eye area collapsed to dark due to the shadow of the cap of the subject may be recovered automatically without requiring manual operations. Consequently, the image P2 with extremely high recovery accuracy may be obtained easily without requiring any operational skills.

Note that, when another processing is selected on the menu screen in FIG. 4, the image recovery/addition process may be realized without modifying the configuration by appropriately changing the type of sample images for generating the mathematical model M, and of learning sample images used in the learning process for generating the discriminators in the face detection section 31 as required.

For example, when "Remove Net Fence" is selected on the menu screen in FIG. 4, an image of a person with a net pattern superimposed thereon obtained by imaging the person over a net fence is processed to remove the net pattern from the image and recover the face portion of the person. In this case, face images without net patterns superimposed thereon are used as the sample images for generating the mathematical model M, and face images with net patterns superimposed thereon are used as the sample images used in the learning process for generating the discriminators in the face detection section 31. This allows the image recovery/addition section 32 to apply a face portion P1$f$ with a net pattern superimposed thereon detected by the face detection section 31 from an image P1 obtained by imaging the face over a net fence to the mathematical model M generated through the AAM scheme based on a plurality of sample images without net patterns superimposed thereon, the image reconstruction section 33 to reconstruct a face image P1$f'$ with the net pattern portion recovered based on the parameter C corresponding to the face portion P1$f$ obtained by applying the face portion P1$f$ to the mathematical model M, and further to generate an image P2 by fitting the image P1$f'$ into the face portion of the image P1 and merging therein.

Further, when "Recover Lost Signal" is selected on the menu screen in FIG. 4, an image having halation in the high signal region or collapse in the low signal region due to an excessive contrast between the subject and the background, or an image with a lost image signal of a specific color due to a compression or transmission error of the imaging device is processed to correct the halation or collapse, or recover the lost signal. In this case, face images without halation, collapse, or a lost signal are used as the sample images for generating the mathematical model M, and face images with halation, collapse, or a lost signal are used as the sample images used in the learning process for generating the discriminators in the face detection section 31. Further, if color face images are used for generating the mathematical model M, and monochrome or sepia face images are used as the sample images used in the learning process for generating the discriminators in the face detection section 31, a color face image may be produced from a monochrome or sepia face image.

When "Pimple" is selected on the menu screen in FIG. 4, a face image of a person without any pimple is processed to add some pimples thereon, which may be called as a pimple recovery process. In this case, face images with pimples are used as the sample images for generating the mathematical model M, and face images without pimples are used as the sample images used in the learning process for generating the discriminators in the face detection section 31. This allows the image recovery/addition section 32 to apply a face portion P1f without pimples detected by the face detection section 31 from an image P1 to the mathematical model M generated through the AAM scheme based on a plurality of sample images with pimples, the image reconstruction section 33 to reconstruct a face image P1f' with pimples added (recovered) thereon based on the parameter C corresponding to the face portion P1f obtained by applying the face portion P1f to the mathematical model M, and further to generate an image P2 by fitting the image P1f' into the face portion of the image P1 and merging therein. When adding other menu items, "Wrinkle", "Makeup", "Glasses", or other elements, face images that include the element to be added are used as the sample images for generating the mathematical model M, and face images that do not include the element to be added are used as the sample images used in the learning process for generating the discriminators in the face detection section 31 in the same manner as described above.

Further, although not shown on the menu in FIG. 4, if images with a greater number of gradations are used as the sample images for generating the mathematical model M, and face images with a smaller number of gradations are used as the sample images used in the learning process for generating the discriminators in the face detection section 31, the image recovery/addition section 32 may apply a face portion P1f with a smaller number of gradations detected by the face detection section 31 from an image P1 to the mathematical model M generated through the AAM scheme based on a plurality of sample images with a greater number of gradations, the image reconstruction section 33 may reconstruct a face image P1f' with a greater number of gradations based on the parameter C corresponding to the face portion P1f obtained by applying the face portion P1f to the mathematical model M, and further may generate an image P2 by fitting the image P1f' into the face portion of the image P1 and merging therein. This may be called as a recovery process for the number of gradations.

Still further, if non-blurry face images are used as the sample images for generating the mathematical model M, and blurry face images are used as the sample images used in the learning process for generating the discriminators in the face detection section 31, the image recovery/addition section 32 may apply a blurry face portion P1f detected by the face detection section 31 from an image P1 to the mathematical model M generated through the AAM scheme based on a plurality of non-blurry sample images, the image reconstruction section 33 may reconstruct a non-blurry face image P1f' based on the parameter C corresponding to the face portion P1f obtained by applying the face portion P1f to the mathematical model M, and further may generate an image P2 by fitting the image P1f' into the face portion of the image P1 and merging therein. This may be called as a recovery process for high frequency component of the image.

In the present embodiment, a menu item is provided for each recovery/addition target element as in the menu shown in FIG. 4. But, if face images including a plurality of recovery/addition target elements are used as the sample images for generating the mathematical model M, and face images that do not include these recovery/addition target elements are used as the sample images used in the learning process for generating the discriminators in the face detection section 31, a comprehensive recovery/addition process may be realized.

Figure 12:
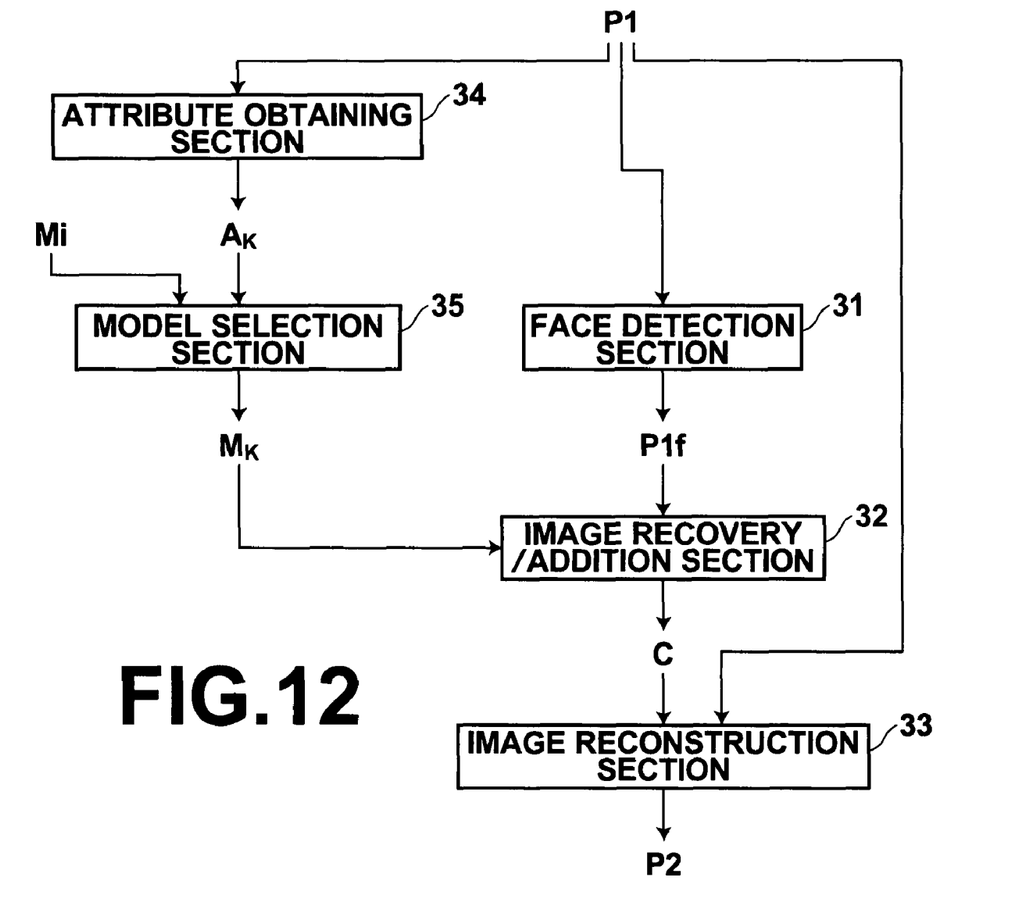
FIG. 12 is a block diagram illustrating an evolutionary embodiment of the image recovery/addition process according to an embodiment of the present invention.

In the embodiment described above, only a single mathematical model M is used, but a plurality of mathematical models $M_i$ (i=1, 2, - - - ) may be generated, each for each attribute, such as human race, age, and gender. FIG. 12 is a block diagram illustrating the image recovery/addition process in this case. As illustrated, the embodiment differs from the embodiment shown in FIG. 5 in that it further includes: an attribute obtaining section 34 for obtaining attribute information $A_k$ of the subject of an image P1; and a model selection section 35 for selecting a mathematical model $M_k$ generated from sample images of subjects having the attribute included in the obtained attribute information $A_k$.

Here, each of the plurality of mathematical models is generated, for example, from a sample image group representing subjects of the same race, age, gender, or the like based on the aforementioned method (FIG. 6), and stored with attribute information $A_i$ that indicates a common attribute in the sample image group being associated therewith.

The attribute obtaining section 34 may be a section for obtaining the attribute information by determining the attribute of the subject of the image P1 through a known recognition process, for example, the process described in Japanese Unexamined Patent Publication No. 11 (1999)-175724, or a section for obtaining the attribute of the subject recorded in the header of the image P1 as appended information at the time of imaging. Further, it may have a function to estimate the attribute of the subject based on the accompanying information. For example, if GPS information for imaged location is available, the country or region corresponding to the GPS information may be identified. Noting that the race of the subject may be estimated from the GPS information to a certain degree, a reference table for associating the GPS information with race information may be provided in advance. Then, using the image data P1 obtained by a digital camera capable of obtaining GPS information at the time of imaging and recording it in the header region of the image P1 (e.g., digital camera disclosed in Japanese Unexamined Patent Publication No. 2004-153428) as input, the GPS information recorded in the header region of the image P1 is obtained, and the race of the subject may be estimated by referring to the reference table based on the obtained GPS information.

The model selection section 35 obtains the mathematical model $M_k$ associated with the attribute information $A_k$ obtained by the attribute obtaining section 34. The image recovery/addition section 32 applies the face portion P1f of the image P1 to the mathematical model $M_k$.

In this way, if a configuration is adopted in which a plurality of mathematical models Mi is provided, each for each attribute, in advance; the model selection section 35 selects a mathematical model $M_k$ associated with the attribute $A_k$ obtained by the attribute obtaining section 34; and the image recovery/addition section 32 applies the face shape P1f to the selected mathematical model $M_k$, no unique vector for explaining the variation in the face shape or luminance arising from the difference in the attributes $A_k$ is present in the mathematical model $M_k$, so that the face shape P1f may be represented based only on the unique vectors representing other factors that determine the face shape or luminance. This may improve the processing accuracy and a higher quality image may be obtained.

Preferably, the attribute-based mathematical models are further specialized, and individual-based mathematical models are generated from the viewpoint of the processing accuracy. In this case, it is necessary to associate the images P1 with individuals.

In the embodiment described above, it is assumed that the mathematical model is preinstalled on the digital photograph printer. But, it is also preferable to provide race-based mathematical models in advance, and select the mathematical model according to the shipping country or the region of the printer from the viewpoint of improving the processing accuracy.

Further, the function to generate the mathematical models may be implemented in the digital photograph printer. More specifically, it means just to install a program, for performing the process explained based on the flowchart shown in FIG. 6, on the arithmetic/control unit 50. It is also possible to install a default mathematical model at the time of shipping, and then to customize the mathematical model or generating a new model which is different from the default mathematical model using input to the digital photograph printer. This is particularly effective when individual-based mathematical models are generated.

Still further, in the embodiment described above, face images are represented using separate weighting factors $b_i$ and $\lambda_i$ for face shape and luminance respectively. There is a correlation between the face shape and luminance variations, so that an appearance parameter "c", a new parameter, for controlling both the face shape and luminance may be obtained by performing a principal component analysis on a vector $(b_1, b_2, ---, b_i, ---, \lambda_1, \lambda_2 ---, ---)$ obtained by combining the weighting factors $b_i$ and $\lambda_i$ as shown in the following formulae (7) and (8).

$$S = S_0 + Q_S c \quad (7)$$

$$A = A_0 + Q_A c \quad (8)$$

Here, the variance in the shape from the average face shape is represented by the appearance parameter "c" and the vector $Q_S$, and the variance in the luminance from the average face luminance is represented by the appearance parameter "c" and the vector $Q_A$.

When this model is used, the image recovery/addition section 32 obtains the face luminance under the average face shape based on the formula (8) above by varying the value of the appearance parameter "c", and further reconstructs a face image by transforming the average face shape based on the formula (7) above, and obtains the appearance parameter "c" when the difference between the reconstructed image and the face portion P1f becomes minimal.

Figure 13:
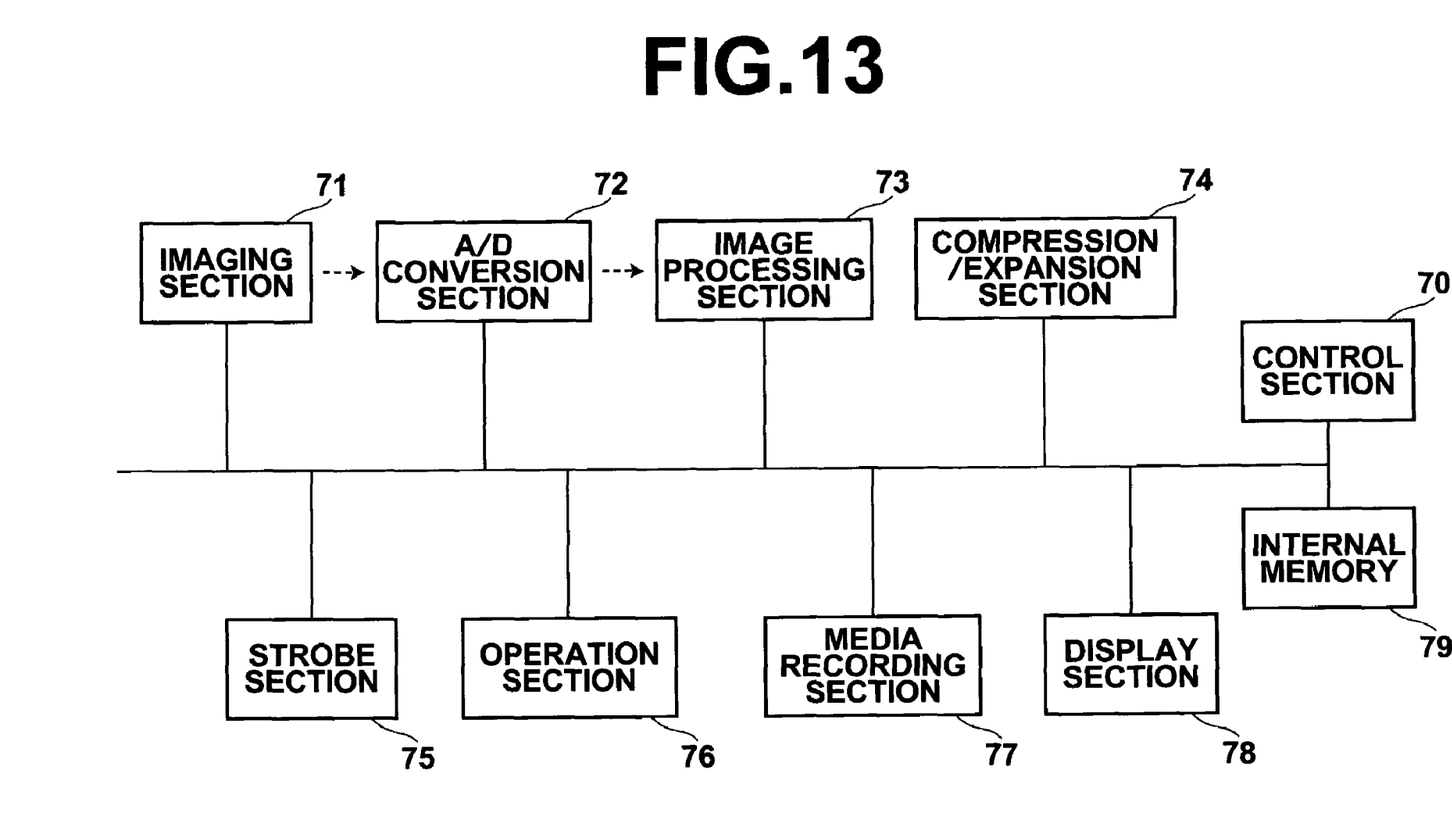
FIG. 13 schematically illustrates the configuration of a digital camera according to another embodiment of the present invention.

Another embodiment of the present invention conceivable is to implement the image recovery/addition process described above in a digital camera. FIG. 13 schematically illustrates the configuration of such digital camera. As illustrated, the digital camera includes: an imaging section 71, formed of a lens, an aperture diaphragm, a shatter, a CCD, and the like, for imaging a subject; an A/D conversion section 72 for obtaining digital image data P0 by digitizing the analog signals of the charges stored in the CCD of the imaging section 71; an image processing section for performing various image processing on the image data P0; a compression/expansion section 74 for performing compression on image data to be recorded on a memory card, or performing expansion on compressed image data from a memory card; a strobe section 75, formed of a strobe light and the like, for strobe emission; an operation section 76, formed of various operation buttons and the like, for specifying imaging conditions, image processing conditions, and the like; a media recording section 77 which is an interface for a memory card on which image data are recorded; a display section 78, formed of a liquid crystal display, or the like, for displaying a through image, a recorded image, and various setting menus; a control section for controlling the process of each of the sections described above; and an internal memory 79 including a control program, image data, and the like.

Here, the function of each means shown in FIG. 2 is realized by the following sections under the control of the control section using the internal memory 79: the image input means 1 by the imaging means 71 and the A/D conversion section 72; the image correction means 2 by the image processing section 73; the image retouching means 3 by the image processing section 73, the operation section 76, and display section 78; and the image output means 4 by the media recording section 77.

An operation and a process flow of the digital camera will now be described.

First, the imaging section 71 focuses light, representing a subject inputted to the lens through a full depression of the shutter by the photographer, on the photoelectric surface of the CCD, which is photoelectrically converted and outputted as analog image signals, and the A/D conversion section 72 converts the outputted analog image signals to digital image signals and outputs the digital image signals as digital image data P0, thereby the function of the image input means 1 is realized.

Then, the image processing section 73 performs automatic white balance correction, white balance correction according to the type of the light source, gradation correction, density correction, color correction, sharpness correction, and the like, and outputs processed image data P1, thereby the function of the image correction means 2 is realized.

Here, the image P1 is displayed on the liquid crystal display of the display section 78. The display layout may be like that shown in FIG. 3A in which a plurality of images in thumbnail format is displayed. The photographer selects a retouching target image and displays it in an enlarged form using the operation buttons of the operation section 76, and further performs manual image correction or retouching through menu selections. Here, if "Recovery/Addition" is selected, and a desired process is selected from the menu screen illustrated in FIG. 4, which appears when "Recovery/Addition" is selected, the control section 70 activates an image recovery/addition program stored in the internal memory 79, and causes the image processing section 73 to perform the image recovery/addition process (FIG. 5, or the like) using the mathematical model M stored in the internal memory 79 in advance, and outputs a processed image data P2. Thereby the function of image retouching means 3 is realized.

Then, the compression/expansion section 74 performs compression on the image data P2 based on a compression format, such as JPEG or the like, and records the compressed image data on a memory card loaded in the digital camera through the media recording section 77, thereby the function of the image output section 4 is realized.

In this way, by implementing the image recovery/addition process according to the present invention as an image processing function of a digital camera, identical effects to those of the digital photograph printer may be obtained.

Here, a configuration may be adopted in which the image recovery/addition process is also performed on the image data stored in a memory card. More specifically, the image data stored in the memory card are expanded (decompressed) by the compression/expansion section 74, and the image represented by the expanded image data is displayed on the liquid crystal display of the display section 78. Then, a desired process is selected by the photographer in the same manner as described above, and the selected process is performed by the image processing section 73.

Further, the attribute-based mathematical models explained in FIG. 12 and the like, or the mathematical model generation process explained in FIG. 6 may be implemented in a digital camera. Here, it is often the case that the persons who become the subjects of photographs taken by a specific digital camera. Therefore, if individual-based mathematical models for persons who often become the subjects of photographs taken by the digital camera, models without variations in the face due to personal difference may be generated. Consequently, the recovery/addition process for the faces of these persons may be performed with extremely high accuracy.

In addition to the embodiments described above, a program for causing a personal computer or the like to perform the image recovery/addition process of the present invention may be incorporated in retouching software. This allows the user to install the software on a personal computer or the like from a recording medium, such as a CD-ROM or the like, including the software, or from a predetermined website by downloading the software therefrom. In this way, the user may use the image recovery/addition process of the present invention as one of the image editing/retouching schemes in its own personal computer.

What is claimed is:

1. An image processing method for recovering a predetermined missing element in a structure represented in an input image, the method comprising the steps of:
   obtaining weighting parameters for statistical characteristic amounts corresponding to the structure in the input image by applying the structure in the input image to a model representing an object which belongs to the same category of matter as that of the structure in which the element missing in the input image is present, the model obtained by performing predetermined statistical processing on a plurality of images each representing an object which belongs to the same category of matter as that of the structure in which the element missing in the input image is present, and the model representing the object by one or more statistical characteristic amounts representing components in the structure in which the element missing in the input image is present and by one or more weighting parameters for weighting the statistical characteristic amounts based on a characteristic specific to the structure; and
   generating an output image in which the missing element has been recovered based on the obtained weighting parameters and the statistical characteristic quantities.

2. An image apparatus for recovering a predetermined missing element in a structure represented in an input image, the apparatus comprising:
   a memory storing a model representing an object which belongs to the same category of matter as that of the structure in which the element missing in the input image is present, the model obtained by performing predetermined statistical processing on a plurality of images each representing an object which belongs to the same category of matter as that of the structure in which the element missing in the input image is present, and the model representing the object by one or more statistical characteristic amounts representing components in the structure in which the element missing in the input image is present and by one or more weighting parameters for weighting the corresponding statistical characteristic amounts based on a characteristic specific to the structure;
   a parameter obtaining means for obtaining weighting parameters for statistical characteristic amounts corresponding to the structure in the input image by applying the structure in the input image to the model; and
   a recovering means for generating an output image in which the missing element has been recovered based on the obtained weighting parameters and the statistical characteristic quantities.

3. The image processing apparatus according to claim 2, wherein:
   the apparatus further comprises a detection means for detecting the predetermined structure in the input image; and
   the recovery means is a means for applying the structure detected by the detection means to the model.

4. The image processing apparatus according to claim 2, wherein:
   a plurality of models is provided, each for each attribute of the predetermined structure;
   the apparatus further comprises a selection means for obtaining the attribute of the predetermined structure in the input image and selecting the model according to the obtained attribute; and
   the recovery means is a means for performing the application to the model selected by the selection means.

5. The image processing apparatus according to claim 2, wherein the predetermined structure is a human face.

6. The image processing apparatus according to claim 2, wherein the recovery target element is at least one of a portion of the region of the structure, a portion of color signals representing the structure, a portion of spatial frequency components representing the structure, and the number of gradations representing the structure.

7. The image processing apparatus according to claim 2, wherein the model and the application to the model are realized by an active appearance model scheme.

8. A computer readable non-transitory recording medium having recorded thereon an image processing program for causing a computer to perform a process for recovering a predetermined missing element in a structure represented in an input image, the program comprising the procedures of:
   obtaining weighting parameters for statistical characteristic amounts corresponding to the structure in the input image by applying the structure in the input image to a model representing an object which belongs to the same category of matter as that of the structure in which the element missing in the input image is present, the model obtained by performing predetermined statistical processing on a plurality of images each representing an object which belongs to the same category of matter as that of the structure in which the element missing in the input image is present, and the model representing the object by one or more statistical characteristic amounts representing components in the structure in which the element missing in the input image is present and by one or more weighting parameters for weighting the corresponding statistical characteristic amounts based on a individual specific to the structure; and
   generating an output image in which the missing element has been recovered based on the obtained weighting parameters and the statistical characteristic quantities.

* * * * *